US007914052B1

(12) United States Patent
Christianson

(10) Patent No.: US 7,914,052 B1
(45) Date of Patent: Mar. 29, 2011

(54) SPLINED CONNECTOR FOR A POSITION-SENSITIVE DEVICE SUCH AS A SHOWERHEAD

(75) Inventor: Thomas R. Christianson, Napa, CA (US)

(73) Assignee: ShowerTek, Inc., Napa, CA (US)

( * ) Notice: Subject to any disclaimer, the term of this patent is extended or adjusted under 35 U.S.C. 154(b) by 795 days.

(21) Appl. No.: 11/837,535

(22) Filed: Aug. 12, 2007

(51) Int. Cl.
*F16L 25/00* (2006.01)

(52) U.S. Cl. ........................................ 285/330; 285/390

(58) Field of Classification Search ........................ None
See application file for complete search history.

(56) References Cited

U.S. PATENT DOCUMENTS

| | | | | |
|---|---|---|---|---|
| 1,512,298 | A | 10/1924 | Mueller | |
| 3,064,998 | A | 11/1962 | Syverson | |
| 3,563,469 | A | 2/1971 | Stacey | |
| 3,623,753 | A * | 11/1971 | Henry | 285/330 |
| 4,674,774 | A | 6/1987 | Williams | |
| 4,905,766 | A * | 3/1990 | Dietz et al. | 169/91 |
| 4,919,461 | A * | 4/1990 | Reynolds | 285/148.13 |
| 4,927,187 | A * | 5/1990 | Sanford et al. | 285/80 |
| 4,964,573 | A | 10/1990 | Lipski | |
| 5,048,871 | A * | 9/1991 | Pfeiffer et al. | 285/39 |
| 5,094,491 | A * | 3/1992 | Berghammer et al. | 285/92 |
| 5,269,385 | A * | 12/1993 | Sihlis | 175/74 |
| 5,321,205 | A * | 6/1994 | Bawa et al. | 174/655 |
| 5,348,349 | A * | 9/1994 | Sloane | 285/92 |
| 5,586,791 | A | 12/1996 | Kirchner et al. | |
| 5,763,833 | A * | 6/1998 | Bawa et al. | 174/655 |
| 5,851,035 | A * | 12/1998 | Marc et al. | 285/86 |
| 5,882,044 | A * | 3/1999 | Sloane | 285/92 |
| 6,021,952 | A * | 2/2000 | Antoniello et al. | 236/12.16 |
| 6,116,658 | A * | 9/2000 | Bohlen | 285/330 |
| 6,196,266 | B1 * | 3/2001 | Breda | 137/625.11 |
| 6,293,595 | B1 * | 9/2001 | Marc et al. | 285/92 |
| 6,357,981 | B1 * | 3/2002 | Lanham et al. | 411/431 |
| 6,651,939 | B2 | 11/2003 | Bischoff et al. | |
| 6,666,227 | B2 * | 12/2003 | Erickson | 137/270 |
| 6,807,983 | B1 * | 10/2004 | Erickson | 137/359 |
| 6,913,033 | B2 * | 7/2005 | Breda | 137/218 |
| 7,390,032 | B2 * | 6/2008 | Hughes | 285/330 |
| 7,509,971 | B2 * | 3/2009 | Kajuch | 137/359 |
| 2002/0035752 | A1 | 3/2002 | Gransow et al. | |
| 2002/0175519 | A1 | 11/2002 | Mack et al. | |
| 2005/0283904 | A1 | 12/2005 | Macan et al. | |

* cited by examiner

*Primary Examiner* — Aaron Dunwoody
(74) *Attorney, Agent, or Firm* — David Pressman

(57) ABSTRACT

A showerhead or other water-dispensing assembly (100) is joined to a supply pipe (105) by a nut (110) and a collar (135). The supply pipe terminates in male threads (130). The nut includes a distal splined projecting section (120). The dispensing assembly includes a port (145) having a splined section (155), and an inner wall (160). The collar is slid onto the pipe, the nut is screwed onto the pipe, and the showerhead is held in its desired orientation while being urged toward the nut. As the distal splined projecting section enters the inner wall, the two splined sections engaged, preventing rotation of the showerhead on the pipe. The collar is then screwed onto the showerhead until it rests against the outer shoulder of the nut, thereby completing the non-rotatable installation.

20 Claims, 1 Drawing Sheet

SPLINED CONNECTOR FOR A POSITION-SENSITIVE DEVICE SUCH AS A SHOWERHEAD

CROSS-REFERENCE TO RELATED APPLICATIONS

Reference is made to my co-pending U.S. patent application Ser. No. 11/465,648, filed Aug. 18, 2006, now abandoned, which is incorporated herein by reference.

BACKGROUND

1. Field

The field is fluid couplings, in particular connectors for use in mounting showerheads or other position-sensitive devices such as fluid couplings and pipes to threaded supply lines.

2. Prior Art

Fluid couplings are used to connect a pipe or other fluid conveying device to another pipe or utilization device, such as a showerhead or faucet. It is desirable and usually essential that such a fluid coupling be able to prevent relative rotation between the two connected devices. For example it is important that a showerhead not rotate about the axis of its water supply pipe; otherwise, water exiting the showerhead could be misdirected or the showerhead could tilt to an undesirable position. Heretofore various fluid couplings for preventing such rotation were known.

Mueller, in U.S. Pat. No. 1,512,298 (1919), shows a pipe union with corrugations on one mating face to resist rotation through the use of friction between two pipe segments.

Syverson, in U.S. Pat. No. 3,064,998 (1957), shows a coupling for a grease gun in which two facing surfaces within the coupling have teeth or serrations that prevent relative rotation of the two halves.

In U.S. Pat. No. 3,563,469 (1969), Stacey shows a spray showerhead having internal splines that are used to create a spray effect.

Williams, in U.S. Pat. No. 4,674,774 (1984), shows a coupling having rotation prevention means comprising a ring of cavities or depressions on two facing members and a ball that is placed in two mating cavities to prevent rotation.

Lipski, in U.S. Pat. No. 4,964,573 (1989), shows a showerhead adapter in which the angle of a showerhead handle can be adjusted and locked. This concept is similar to Syverson's.

Kirchner et al., in U.S. Pat. No. 5,586,791 (1995), show a push-fit, splined connector for joining a fluid supply line and a pipe in a non-rotatable manner.

In U.S. Pat. No. 6,651,939 (2000), Bischoff et al. show a showerhead holder comprising a wall-mountable bracket and a body that can be oriented as desired then locked together using mating teeth.

Mack et al, in published U.S. application 20020175519, show an anti-rotation arrangement for a submersible well pump comprising a coupling with mating teeth on facing surfaces.

In published U.S. application 20020035752, Gransow et al show a two-head shower fixture with splines that prevent pivoting of the U-tube that holds the heads.

Macan et al., in published U.S. application 20050283904, show a positionable shower arm with internal splines for locking the arm in position.

The prior-art couplings described above generally prevent relative rotation of the coupled conduits. Some of these couplings relied on friction or interfering serrations on facing surfaces, but those are prone to eventual misalignment as their frictional surface wears or if the force holding the two halves together is reduced. Other prior-art couplings relied on pressure between a washer and the shower pipe. If these were over-tightened, the washers could fail and the seal became compromised.

SUMMARY

In accordance with one aspect of a preferred embodiment, a fluid coupling is characterized by the use of a keyed or geared spline and an enclosing tightening collar that allow a showerhead to be positioned and held in any orientation without damaging a washer seal.

DRAWING FIGURES

REFERENCE NUMERALS

| | | |
|---|---|---|
| 100 Showerhead assembly | 105 Pipe | 110 Nut |
| 115 Threads | 116 Lumen | 120 Section |
| 124 Facet | 125 Sealing O-ring | 126 Wall |
| 130 Threads | 135 Collar | 140 Threads |
| 142 Shoulder | 144 Wall | 145 Port |
| 146 Branch | 147 Branch | 148 Arm |
| 149 Arm | 150 Threads | 155 Section |
| 160 Wall | 165 Orifice | 200 Harp |
| 205 Showerhead | 210 Valve | |

FIRST EMBODIMENT

Description

FIG. 1

Figure 1:
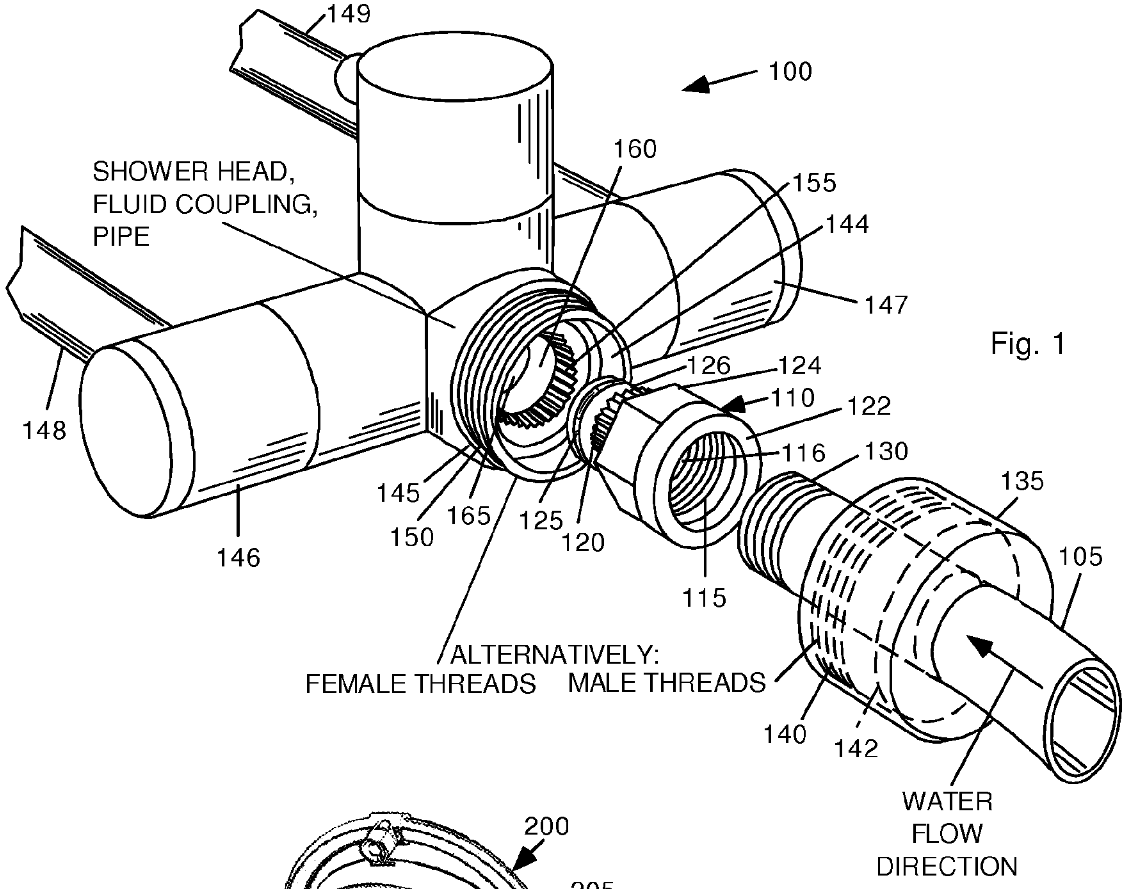
FIG. 1 is a perspective, exploded view of a connector showing one embodiment of a fluid coupling that will prevent relative rotation between the coupled conduits.

FIG. 1 shows an exploded, perspective view of a showerhead assembly 100, fluid coupling, or pipe that is to be mounted on a supply pipe 105. In the present embodiment, a hollow nut 110 is interposed between assembly 100 and pipe 105. Nut 110 includes center portion with a tool-gripping surface with the usual six external nut flats or facets 124 to facilitate gripping and tightening or loosening the nut. Starting from its upstream end distal from the user but on the right and closer side in the paper, nut 110 has a rear shoulder 122, a lumen 116 containing internal female threads 115, a projecting or wall section 126 on its downstream end having on its outside (a) a keyed or splined section 120 comprising a series of longitudinal external ribs, preferably having a triangular cross section, and (b) a sealing resilient 0-ring 125. 0-ring 125 is seated within a groove wall portion 126. The outer diameter of 0-ring 125 is greater than the outer diameter of wall portion 126 by a small amount, typically one mm. Such seals are well known to those skilled in the art of fluid couplings. External facets 124 are suitable for transmitting torque applied by a wrench or pliers to facilitate tightening nut 110 on pipe 105. In lieu of such facets, the external surface of the nut can be smooth or knurled; such a surface can be grasped by a pipe wrench.

Supply pipe 105 terminates at the showerhead end in male threads 130. A collar 135, having female threads 140 and an internal shoulder 142 is slidably mounted on pipe 105.

Assembly 100 includes an inlet or port 145 with external male threads 150. Threads 150 are of the same diameter and pitch as threads 140 on collar 135. Port 145 further includes in its interior, starting from the entry or upstream end, a wide plain wall section 144 followed by a narrower splined or keyed section 155, followed in turn by a plain inner wall 160 that extends into an orifice 165 for admitting water from pipe 105 to the interior of assembly 100. The diameter of inner wall portion 160 is sized to slidably admit wall portion 126 of nut 110 while compressing O-ring 125 between wall portion 160 and wall portion 126. The teeth or keys within splined section 155 are sized to slidably and conformingly mate with those in splined section 120.

The outer diameter of pipe 105 is typically 1.9 cm. Spline section 120 had 18 triangular ribs, with each rib being about 1 mm high. The number of splines can be increased for greater resolution of alignment. All other components in FIG. 1 are scaled accordingly. Collar 135, nut 110, and assembly 100 can be made of a metal such as brass or stainless steel, of a sturdy plastic, or even a ceramic material.

Port 145 communicates with left and right branches 146 and 147 which in turn are connected to two shower arms 148 and 149 which form a harp 200 (FIG. 2) that holds a large showerhead 205 which is described in my above co-pending application. A valve 210 controls water flow from port 145 to branches 148 and 149, and to an optional additional showerhead 215. In lieu of branches 148 and 149 a single pipe can be used.

First Embodiment

Operation

Figure 2:
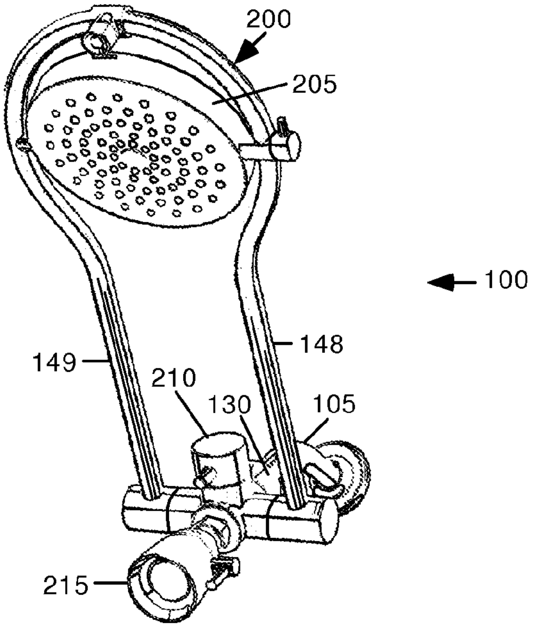
FIG. 2 shows the embodiment of FIG. 1 in use.

FIGS. 1 and 2

The installation of head assembly 100 on pipe 105 is accomplished in the following steps:

(1) Collar 135 is slid over pipe 105 as shown with threads 140 facing toward the intended position of assembly 100.

(2) The distal end of nut 110 is positioned at the end of pipe 105 so that threads 130 on supply pipe 105 will meet and mate with threads 115 in nut 110.

(3) Nut 110 is screwed onto pipe 105 until tight. A thread sealant, such as PTFE (polytetrafluoroethylene) tape (not shown), can be used to ensure a leak-proof seal, if desired. Torque from a wrench (not shown) can be applied to facets 124 to tighten nut 110 on pipe 105.

(4) Head assembly 100 is held at its desired orientation while being moved toward the proximal end of nut 110. As wall portion 126 slidably enters inner wall 160, O-ring 125 is compressed against wall 160, forming a water-tight joint.

(5) Assembly 100 is rotated about the axis of port 145 until the desired orientation is reached. Then assembly 100 is urged toward nut 110, engaging the teeth or keys of spline portions 120 and 155. The spline teeth are closely spaced so that a slight misalignment due to interference between mating teeth will pass unnoticed.

(6) Collar 135 is slid toward assembly 100 and threads 140 and 150 are engaged and screwed together until shoulder 142 of collar 135 presses tightly against shoulder 122 of nut 110.

At this point, assembly 100 is securely and non-rotatably affixed to pipe 105. This completes the installation of assembly 100 on pipe 105.

FIG. 2 shows showerhead 100 securely and non-rotatably mounted on supply pipe 105. After installation, properly tightened collar 130 conceals nut 110 and the remaining internal components of the coupling. Due to the two sets of mating splines, assembly 100 will not be able to rotate on pipe 105, yet the coupling or union will be water-tight, secure, and have an attractive, clean look.

SUMMARY, RAMIFICATIONS, AND SCOPE

The embodiment and variations described and shown of my improved showerhead connector ensure that an installed showerhead will remain in a desired orientation. A collar is first slid onto the supply pipe. Then a nut is screwed onto the supply pipe, whereafter the showerhead assembly is mounted onto the nut. Mating spline sections on the nut and within a port leading into the showerhead assembly permit rotational alignment during installation, yet when engaged prevent subsequent misalignment. An O-ring seal permits alignment, then provides a long-lasting water seal. When screwed onto the assembly, the collar secures the showerhead assembly to the nut. The collar can be tightened by hand, thereby preventing unsightly wrench marks on the collar, and concealing any marks on the nut.

While the above description contains many specificities, these should not be considered limiting but merely exemplary. Many variations and ramifications are possible.

Instead of being round, the exterior shape of the collar can be square, hexagonal, octagonal, or another shape. Instead of triangular spline teeth, square, rectangular, or semicircular teeth can be used. Instead of female threads on the collar and male threads on the showerhead assembly, the genders of the threads can be reversed.

Instead of a large open orifice leading from the supply pipe through to the showerhead assembly, a flow restrictor can be inserted.

Instead of female threads on the nut, male threads can be used to mate with female threads on a supply pipe.

Instead of a single O-ring seal, two or more such seals can be used.

A smooth, round surface can be used in place of facets for a wrench. In this case, pliers or a pipe wrench can be used to tighten the nut onto the supply pipe.

Instead of the sizes described, all elements of the design can be larger or smaller.

Instead of being mounted on a fixed supply pipe, the showerhead can be mounted on a handle at the end of a water feed hose.

The number of spline ribs can be smaller or larger and the shape of the ribs can vary. Instead of having a full set of teeth or ribs on both splines, one spline can have a full set of teeth while the other spline has as few as one tooth. If a single tooth is used, it can be replaced by a pin inserted in the nut at a location that would otherwise be occupied by a tooth.

Instead of being used to couple a supply pipe with the flippable showerhead with two supporting arms as shown, the showerhead can be a simple showerhead with a single supply pipe. The union can be used to couple other fluid conduits, such as pipes, spigots, hoses, and the like.

While the present system employs elements which are well known to those skilled in the arts of showerhead and fluid coupling design, it combines these elements in a novel way which produces one or more new results not heretofore discovered. Accordingly the scope of this invention should be determined, not by the embodiments illustrated, but by the appended claims and their legal equivalents.

The invention claimed is:

1. A fluid coupling for coupling a position-sensitive fluid utilization or dispensing device to a supply pipe having a dispensing end, comprising:

a collar having a set of threads at a first end and an internal shoulder at a second end, said collar being slidably mountable on a supply pipe having a set of threads at a dispensing end, a hollow nut having a set of threads and an external shoulder at a first end and a projecting section having a splined section and a compressible seal at a second end, said set of threads at said first end being arranged to mate with said set of threads on said supply pipe, and a fluid utilization or dispensing device having an inlet or port having (a) a set of threads arranged to mate with said set of threads of said collar, (b) a splined section for mating with said splined section of said nut, and (c) an inner wall arranged to compress said seal on said projecting section of said nut for forming a watertight joint, whereby said fluid utilization or dispensing device can be mounted onto said supply pipe in a secure and non-rotatable position.

2. The coupling of claim 1 wherein said set of threads of said collar have a female gender and said set of threads of said fluid utilization or dispensing device have a male gender.

3. The coupling of claim 1 wherein said set of threads of said collar have a male gender and said set of threads of said fluid utilization or dispensing device have a female gender.

4. The coupling of claim 1 wherein said collar, said nut, and said fluid utilization or dispensing device are made from materials selected from the group consisting of metal, plastic, and ceramic.

5. The coupling of claim 1 wherein said seal is an O-ring.

6. The coupling of claim 1 wherein said fluid utilization or dispensing device is a showerhead.

7. A fluid coupling for mounting a fluid utilization or dispensing device to a supply pipe, comprising:

a nut having a center portion with a tool-gripping surface to facilitate gripping and tightening or loosening said nut, a shoulder on a first end of said nut for engagement by a collar, a set of threads at said first end of said nut for attaching said nut to said fixed supply pipe having threads at a dispensing end thereof, a projecting section on a second end of said nut opposite said first end thereof, said projecting section on said second end of said nut having a resilient seal thereon for forming a watertight joint within said device, said projecting section also having a splined section thereon for slidably mating with a splined section within said fluid utilization or dispensing device, said nut having a through hole or lumen extending through said shoulder, said center portion, and said projecting portion for conducting water from said pipe to said fluid utilization or dispensing device, a collar that can be slidably mounted on said pipe, said collar having a set of threads thereon and a shoulder for mating with said shoulder of said nut, a fluid utilization or dispensing device comprising a port having a splined section for mating with said splined section on said projecting section of said nut, a sealing surface for sealingly mating with said resilient seal on said projecting section of said nut, and a set of threads for mating with said set of threads on said collar, whereby said fluid utilization or dispensing device can be mounted onto said supply pipe in a secure, watertight, and non-rotatable position.

8. The fluid coupling of claim 7 wherein said nut and said collar are made from materials selected from the group consisting of metal, plastic, and ceramic.

9. The fluid coupling of claim 7 wherein said set of threads of said nut and said port are selected from the group consisting of male and female.

10. The fluid coupling of claim 7 wherein said seal is an O-ring and said tool-gripping surface comprises a set of flat surfaces extending around said center portion.

11. The fluid coupling of claim 7, wherein said fluid utilization or dispensing device is a showerhead and said collar encloses said nut when said collar is tightened to said device.

12. A method for mounting a position-sensitive fluid utilization or dispensing device to a fixed supply pipe, comprising:

providing a supply pipe with a set of threads at a dispensing end, providing a collar having a set of threads at a first end and a shoulder at a second end, providing a nut with a shoulder and a set of threads at a first end, and a projecting section having a splined section and a seal at a second end, providing a fluid utilization or dispensing device having a port with a set of threads, an inner wall, and a splined section, slidably mounting said collar on said pipe, screwing said nut onto said threads of said pipe, slidably coupling said showerhead to said nut and engaging said splined section of said port of said fluid utilization or dispensing device and said splined section on said projecting section of said nut, and screwing said collar onto said port until said shoulders of said collar and said nut are in firm contact, thereby completing installation of said fluid utilization or dispensing device on said pipe, whereby said fluid utilization or dispensing device can be mounted onto said supply pipe in a secure and non-rotatable position.

13. The method of claim 12, further including providing said collar with a set of threads of the male gender and said of fluid utilization or dispensing device with a set of threads of the female gender.

14. The method of claim 12, further including providing said collar with a set of threads of the female gender and said fluid utilization or dispensing device with a set of threads of the male gender.

15. The method of claim 12, further including providing said pipe with a set of threads of the male gender and said nut with a set of threads of the female gender.

16. The method of claim 12, further including providing said pipe with a set of threads of the female gender and said nut with a set of threads of the male gender.

17. The method of claim 12, further including providing said collar, said nut, and said port of materials selected from the group consisting of metal, plastic, and ceramic.

18. The method of claim 12, further including providing said seal by an O-ring.

19. The method of claim 12, further including providing said fluid utilization or dispensing device by a showerhead.

20. The method of claim 12, further including providing said seal by an O-ring and said pipe with a set of threads of the male gender and said nut with a set of threads of the female gender

* * * * *